United States Patent
Nagy

(10) Patent No.: US 10,884,775 B2
(45) Date of Patent: Jan. 5, 2021

(54) METHODS AND APPARATUS TO CONTROL A VIRTUAL MACHINE

(71) Applicant: NOKIA SOLUTIONS AND NETWORKS OY, Espoo (FI)

(72) Inventor: Istvan Nagy, Budapest (HU)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 41 days.

(21) Appl. No.: 15/319,822

(22) PCT Filed: Jun. 17, 2014

(86) PCT No.: PCT/EP2014/062630
§ 371 (c)(1),
(2) Date: Dec. 19, 2016

(87) PCT Pub. No.: WO2015/192881
PCT Pub. Date: Dec. 23, 2015

(65) Prior Publication Data
US 2017/0123836 A1 May 4, 2017

(51) Int. Cl.
*G06F 9/455* (2018.01)
*G06F 9/48* (2006.01)
*G06F 9/50* (2006.01)

(52) U.S. Cl.
CPC .......... *G06F 9/45558* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/4557; G06F 9/5083;
(Continued)

(56) References Cited

U.S. PATENT DOCUMENTS

| 8,495,323 B1 | 7/2013 | Tatavarty |
| 9,043,636 B2 * | 5/2015 | Cai ............ G06F 11/0709 714/4.2 |

(Continued)

FOREIGN PATENT DOCUMENTS

| CN | 103034536 A | 4/2013 |
| EP | 1 870 814 A1 | 12/2007 |

OTHER PUBLICATIONS

Robertson, "Resource fencing using STONITH", IBM Linux Technology Center, 2001, pp. 1-9 plus cover.*

(Continued)

*Primary Examiner* — Charles M Swift
(74) *Attorney, Agent, or Firm* — Squire Patton Boggs (US) LLP

(57) ABSTRACT

Methods and apparatus, to control a virtual machine, include: sending identification of virtual machines within a recovery domain, receiving a request to control one the virtual machines, authorizing the request, and forwarding the request to a virtual machine manager of the one of the virtual machines. Other methods and apparatus, to control a virtual machine, include: sending a request for identification of virtual machines within a recovery domain directly to a cloud computing device without passing the request through another computing device, determining that one of the virtual machines needs to be controlled, and sending a request to control the one of the virtual machines directly to the cloud computing device without passing the request through another computing device.

18 Claims, 3 Drawing Sheets

(52) U.S. Cl.
CPC ............... *G06F 9/48* (2013.01); *G06F 9/485* (2013.01); *G06F 9/4806* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/5061* (2013.01); *G06F 9/5077* (2013.01); *G06F 9/5083* (2013.01); *G06F 9/5088* (2013.01); *G06F 2009/4557* (2013.01); *G06F 2009/45562* (2013.01); *G06F 2009/45575* (2013.01); *G06F 2009/45595* (2013.01)

(58) Field of Classification Search
CPC ......... G06F 9/5088; G06F 2009/45575; G06F 9/48; G06F 9/4806; G06F 9/4843; G06F 9/485; G06F 9/4856; G06F 9/4881; G06F 9/50; G06F 9/5005; G06F 9/5061; G06F 9/5077
See application file for complete search history.

(56) References Cited

U.S. PATENT DOCUMENTS

| | | | |
|---|---|---|---|
| 2004/0172629 A1* | 9/2004 | Tene | G06F 9/45537 718/1 |
| 2006/0184937 A1* | 8/2006 | Abels | G06F 8/65 718/1 |
| 2007/0260702 A1* | 11/2007 | Richardson | G06F 17/30861 709/217 |
| 2009/0216975 A1* | 8/2009 | Halperin | G06F 9/45537 711/162 |
| 2009/0313447 A1* | 12/2009 | Nguyen | G06F 11/1451 711/162 |
| 2010/0319059 A1* | 12/2010 | Agarwal | H04L 9/321 726/7 |
| 2011/0022694 A1 | 1/2011 | Dalal et al. | |
| 2011/0125991 A1* | 5/2011 | Annan | G06F 9/44594 713/2 |
| 2011/0131576 A1* | 6/2011 | Ikegaya | G06F 9/455 718/1 |
| 2011/0289344 A1* | 11/2011 | Bae | G06F 11/181 714/4.2 |
| 2012/0096271 A1* | 4/2012 | Ramarathinam | H04L 63/0807 713/172 |
| 2012/0110574 A1* | 5/2012 | Kumar | G06F 9/45558 718/1 |
| 2012/0137098 A1* | 5/2012 | Wang | G06F 3/0617 711/165 |
| 2012/0151479 A1* | 6/2012 | Kothari | G06F 9/5011 718/1 |
| 2013/0074064 A1* | 3/2013 | Das | G06F 8/61 718/1 |
| 2013/0139219 A1 | 5/2013 | Cai | |
| 2013/0151681 A1* | 6/2013 | Dournov | G06F 8/656 709/223 |
| 2013/0326173 A1* | 12/2013 | Tsirkin | G06F 9/45558 711/162 |
| 2014/0019974 A1* | 1/2014 | Siu | G06F 9/4856 718/1 |
| 2014/0040446 A1* | 2/2014 | Cohen | G06F 9/5055 709/223 |
| 2014/0101300 A1* | 4/2014 | Rosensweig | G06F 9/5072 709/223 |
| 2014/0115137 A1* | 4/2014 | Keisam | H04L 12/6418 709/223 |
| 2014/0280436 A1* | 9/2014 | Larkin | H04L 67/10 709/201 |
| 2014/0282520 A1* | 9/2014 | Sabharwal | G06F 9/455 718/1 |
| 2015/0113526 A1* | 4/2015 | Baboval | G06F 9/45533 718/1 |
| 2015/0120887 A1* | 4/2015 | Hu | G06F 8/61 709/220 |
| 2015/0156203 A1* | 6/2015 | Giura | H04L 63/101 726/4 |
| 2015/0254103 A1* | 9/2015 | Chandrasekaran | G06F 9/4856 718/1 |
| 2016/0099948 A1* | 4/2016 | Ott | G06F 9/54 726/1 |

OTHER PUBLICATIONS

HASTEXO Fencing in Libvirt/KVM virtualized cluster nodes; 2012; http://www.hastexo.cm/resources/hints-and-kinks/fencing-libvirtkvm-virtualized-cluster-nodes.
Clusterlabs Guest Fencing; 2012; http://clusterlabs.org/wiki/Guest_Fencing.
GITHUB OpenStack Fencing Tool; 2014; https://github.com/rdoxenham/openstack-fence.
International Search Report and Written Opinion dated Feb. 5, 2015 corresponding to International Patent Application No. PCT/EP2014/062630.
Communication pursuant to Article 94(3) EPC dated Aug. 7, 2018 corresponding to European Patent Application No. 14730534.6.
Chinese Office Action corresponding to CN Appln. No. 201480081297.7, dated Feb. 3, 2020.
European Office Action issued in corresponding European Patent Application No. 14 730 534.6-1203 dated May 15, 2020.
GS NFV-MAN 001 V05.0 (May 2014), ETSI Group Specification, Network Function Virtualization (NFV) Management and Orchestration, 195 pages.
Draft ETSI GS NFV-REL 001 V0.1.0 (May 2014), ESTI Group Specification, Network Function Virtualisation (NFV); Resiliency Requirements, 69 pages.
Chinese Office Action corresponding to CN Appln. No. 201480081297.7, dated Aug. 31, 2020.

* cited by examiner

METHODS AND APPARATUS TO CONTROL A VIRTUAL MACHINE

TECHNICAL FIELD

Example embodiments disclosed herein relate to virtual machines, particularly, virtual machines within cloud infrastructures.

BACKGROUND

The use of cloud infrastructures is becoming increasing popular. In data centers there is an ongoing trend to "cloudify", i.e. using virtualization technologies to decouple applications from hardware deployment. Typically, applications such as video or web servers run on virtual machines which can be deployed on any suitable hardware. Thus, servers and applications may be invoked and shut down on demand and the hardware (e.g. information technology (IT) servers in racks and data storage) may be used almost arbitrarily. All of these components form a "cloud". Furthermore, if applications are built in a suitable way, the same hardware may serve almost any sort of application. Therefore, instead of building their own "clouds" service providers may make use of third party clouds, add these capacities in storage and computing to their existing ones, or even solely rely on third party resources to build a cloud infrastructure.

Infrastructure as a Service (IaaS) is a type of service using a cloud infrastructure. Examples of IaaS providers are Amazon's EC2, OpenStack and VMware's vCloud services. IaaS services are currently popular among standard IT services which usually do not require very high availability figures. Accordingly, in many IaaS services, features related to availability are either not implemented yet, or under-prioritized. The latest wave of applications to be ported to cloud/virtualized environments is reaching the telecommunication sector. When compared to IT services, telecommunication applications provide excellent availability, mostly regulated by law. In modern environments, a cloud manager deploys and manages applications on top of an IaaS clouds. Cloud managers are usually capable of scaling the application according to end user needs, and also restarting existing virtual machines or deploying new ones in place of failed virtual machines whenever some kind of failure is detected.

Key features to implement high availability are fencing and STONITH support. Fencing can be defined as a method to permit one node to cut (in other words "fence") another node from the rest of the application, by isolating it from communication and/or storage networks. STONITH stands for "Shoot The Other Node In The Head" and can be defined as a method to permit one node to shut down or restart another node. In many cases, fencing and STONITH needs to happen relatively fast and reliably, such as for example providing a response within a sub-second and with over five 9 s of availability.

In telecommunication applications, high availability is typically ensured by designing redundant pairs of nodes within the telecommunication application. Among these nodes, some kind of heartbeating is performed so that one node can detect the other's failure and take over when necessary. In such an event, the healthy node usually executes fencing, to isolate the other (possibly failed) node from the rest of the application. It is important to determine to detect the failure of a node and execute fencing correctly, in order to prevent split brain scenarios and corrupted shared resources. One example scenario in which the failure of a node has been incorrectly determined is when there is a communication failure on the heartbeating channel, and both nodes incorrectly think that the other has failed.

In traditional deployments, fencing usually involves some hardware functions, such as for example an initiating node triggering a hardware reset and/or network isolation of another node via an intelligent platform management interface (IPMI). However, in cloud and/or virtualized environments, accessing hardware directly is no longer possible. Furthermore, a problem that may occur is that a cloud manager may start a new virtual machine in place of the "failed" node and when the temporary disturbance is resolved, the failed node is reconnected to the network and the supposedly redundant pair becomes a trio.

Therefore, it would be useful to provide methods and apparatus to execute fencing and STONITH methods quickly, accurately and appropriately.

BRIEF DESCRIPTION OF THE DRAWINGS

Example embodiments disclosed throughout the Detailed Description will be described in greater detail with reference to accompanying drawings, in which.

DETAILED DESCRIPTION

The embodiments disclosed throughout this Detailed Description are examples. Although this Detailed Description may refer to "an", "one", or "some" example embodiment(s) in several locations, this does not necessarily mean that each such reference is to the same example embodiment(s), or that the feature only applies to a single example embodiment. Single features of different example embodiments may also be combined to provide other example embodiments. All words and expressions should be interpreted broadly and they are intended to illustrate, not to restrict, the example embodiments.

The example embodiments disclosed throughout this Detailed Description are applicable to any cloud infrastructure in which a cloud manager, or user of a cloud manager, can manage (e.g. have knowledge of and start) the virtual machines in the cloud infrastructure. Examples of such cloud infrastructures are those that provide the cloud service infrastructure as a service (IaaS), such as for example Amazon's EC2, OpenStack and VMware's vCloud services.

Figure 1:
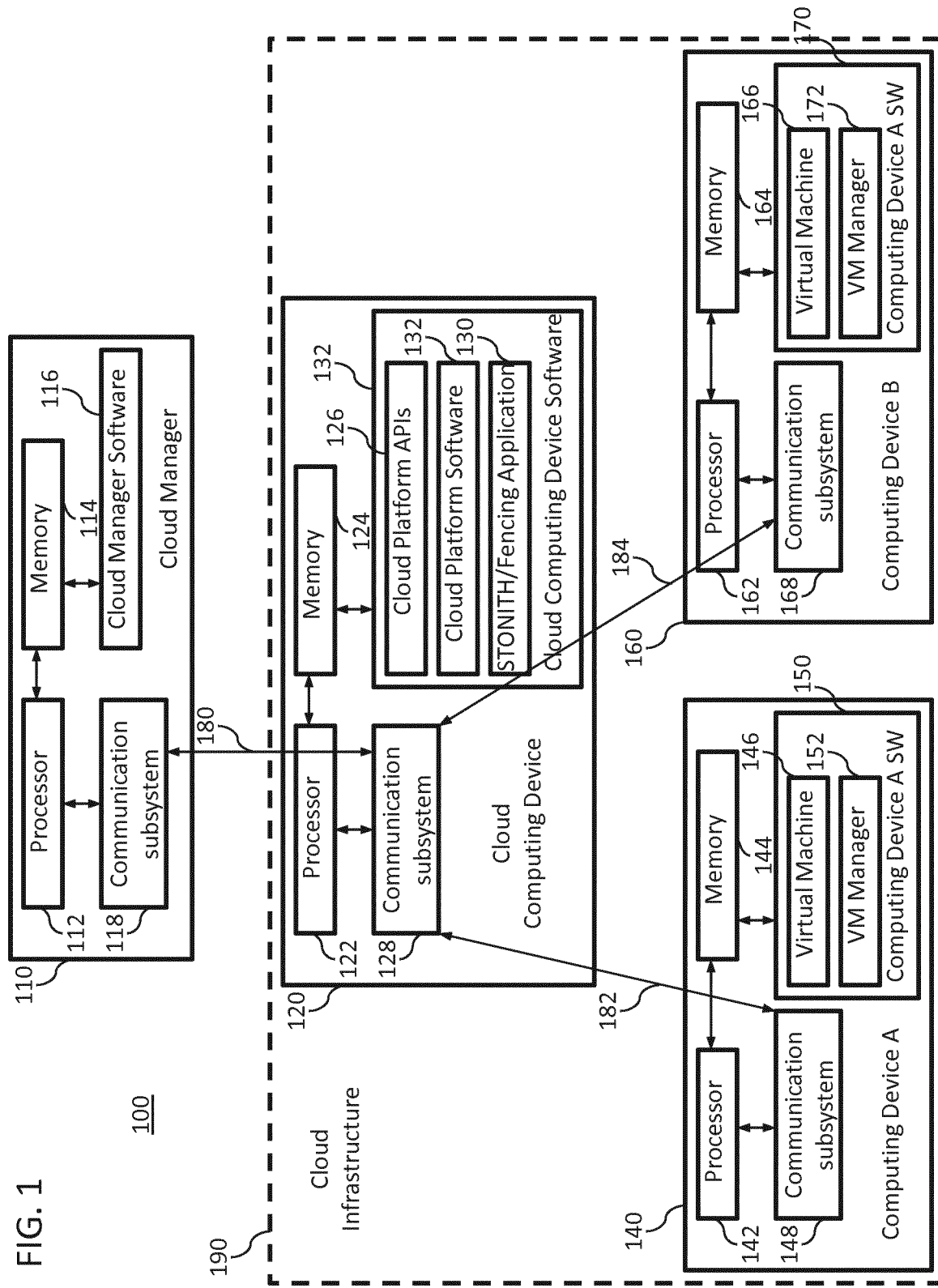
FIG. 1 is a block diagram illustrating a cloud manager and cloud infrastructure, according to an example embodiment.

FIG. 1 illustrates communication system 100, according to an example embodiment, that includes a cloud manager 110 and a cloud infrastructure 190. Cloud infrastructure 190 includes a cloud computing device 120, computing device A 140 and computing device B 160.

In an example embodiment, cloud manager 110 is a computing device including a processor 112 configured to execute cloud manager software 116. Processor 112 is communicatively connected to and interacts directly or indirectly with memory 114 and communication subsystem 118. Memory 114 stores cloud manager software 116 and other data. Cloud manager software 116 manages the virtual machines 146 (of computing device A) and 166 (of computing device B), residing in cloud infrastructure 190. Communication subsystem 118 sends and receives communications to and from cloud manager 110.

In an example embodiment, cloud computing device 120 is a computing device including a processor 122 configured to execute cloud computing device software 132. Processor 122 is communicatively connected to and interacts directly or indirectly with memory 124 and communication subsystem 128. Memory 124 stores cloud computing device software 132. Cloud computing device software 132 includes cloud platform software 132, cloud platform application program interfaces (APIs) 132 and STONITH/fencing application 130. Examples of cloud platform software are: Amazon Elastic Compute Cloud (EC2), OpenStack and VMware. In an example embodiment, cloud platform API(s) 132 could be developed to interface with the cloud platform software 132 and the STONITH/fencing application. Communication subsystem 128 sends and receives communications to and from cloud computing device 120.

In an example embodiment, cloud computing device A 140 is a computing device including a processor 142 configured to execute cloud computing device software A 150. Processor 142 is communicatively connected to and interacts directly or indirectly with memory 144 and communication subsystem 148. Memory 144 stores cloud computing device software A 150 and other data. Computing device software A 150 includes virtual machine 146 and a virtual machine manager 152. (Although one virtual machine 146 is shown, more than one virtual machine may be included in computing device software A 150.) Communication subsystem 148 sends and receives communications to and from computing device A.

In an example embodiment, cloud computing device B 160 is a computing device including a processor 162 configured to execute cloud computing device software B 170. Processor 162 is communicatively connected to and interacts directly or indirectly with memory 164 and communication subsystem 168. Memory 164 stores cloud computing device software B 170 and other data. Cloud computing device software A 150 includes virtual machine 166 and a virtual machine manager 172. (Although one virtual machine 166 is shown, more than one virtual machine may be included in computing device software B 170.) Communication subsystem 168 sends and receives communications to and from processor 162.

Communication subsystem 180 (of cloud manager 110) is communicatively connected to and interacts directly or indirectly with communication subsystem 128 (of cloud computing device 120) using interface 180. Accordingly, it is through communication subsystems 118 and 128 and interface 180, that cloud manager 110 is communicatively connected to and interacts directly or indirectly with cloud computing device 120.

Communication subsystem 128 (of cloud computing device 120) is communicatively connected to and interacts directly or indirectly with communication subsystem 148 (of computing device A 140) using interface 182. Accordingly, it is through communication subsystems 128 and 148 and interface 182, that cloud computing device 120 is communicatively connected to and interacts directly or indirectly with computing device A 140.

Communication subsystem 128 (of cloud computing device 120) is also communicatively connected to and interacts directly or indirectly with communication subsystem 168 (of computing device B 160) using interface 184. Accordingly, it is through communication subsystems 128 and 168 and interface 184, that cloud computing device 120 is communicatively connected to and interacts directly or indirectly with computing device B.

In example embodiments, processors 112, 122, 142 and 162 of FIG. 1, each include hardware or software or any combination of hardware or software.

In example embodiments, memories 114, 124, 144 and 164 of FIG. 1 are each persistent stores, such as for example flash memory, read-only (ROM) memory or other similar storage.

In example embodiments, interfaces 180, 182 and 184 of FIG. 1 are secure communication links, such as for example hypertext transfer protocol secure (HTTPS) links.

In example embodiments, virtual machine managers 152 and 172 of FIG. 1 are pieces of software, firmware, or hardware or any combination thereof, that manages (e.g. create, run, restart, shuts down, and/or fences) virtual machines. In example embodiments, the virtual machine managers 152 and 172 may include a hypervisor and other software components that manage a virtual machine (e.g. libvirt and nova-compute used in OpenStack cloud platforms)

FIG. 1 illustrates a communication system 100 having a simplified architecture and therefore only some elements and functions are shown. The illustrated elements and functions are all logical units, whose implementation may differ from what is shown in FIG. 1. The connections shown in FIG. 1 are logical connections; the actual physical connections may be different. It is apparent to a person skilled in the art that the systems also include other elements and functions, that are not illustrated or discussed in this Detailed Description.

Figure 2:
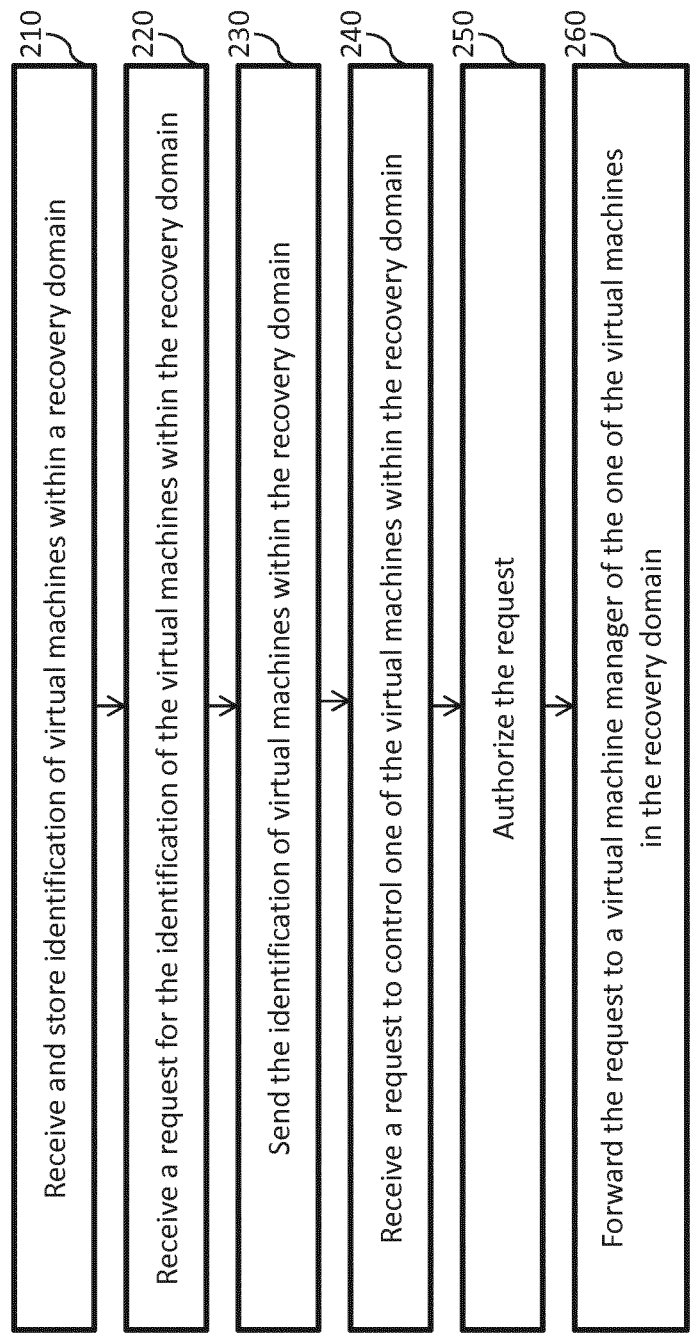
FIG. 2 is a flow chart illustrating a method to control a virtual machine, according to an example embodiment.

FIG. 2 illustrates a method 300 to control a virtual machine, according to an example embodiment. It can be implemented by cloud computing device 120 (of FIG. 1). At 210, the STONITH/fencing application 130 receives identification of virtual machines within a recovery domain. As disclosed herein, a recovery domain can be defined as a group of virtual machines that are permitted to control each other. For example, a virtual machine within a recovery domain can: instruct another virtual machine within the same recovery domain to shut down or restart, or fence another virtual machine.

In an example embodiment, the STONITH/fencing application 130 receives the identification from cloud manager software 116 (of cloud manager 110 of FIG. 1). In an example embodiment, the identification of the virtual machines can be done when the cloud manager software 116 or a user of the cloud manager software 116 initiates launching of one or more virtual machines. Cloud manager software 116 can communicate identification of the launched virtual machine(s) to one of the cloud platform APIs 126 and the cloud platform API can instruct the STONITH/fencing application 130 regarding to which recovery domain the virtual machine(s) belongs. (In an example embodiment, one of the cloud platform APIs 126 determines which virtual machines belong to a particular recovery domain.) The STONITH/fencing application 130 stores the identification of the virtual machines and their corresponding recovery domains.

At 220, one of the cloud platform APIs 126 receives a request for the identification of the virtual machines within a particular recovery domain. In an example embodiment, this request is received from a virtual machine of a computing device that is within cloud infrastructure 190, such as for example virtual machine 146 (of computing device A 140). In this example, virtual machine 146 is requesting identification of the virtual machines that are in the same recovery domain as itself. Furthermore, in an example embodiment, the cloud platform API 126 that is receiving the request is also within the cloud infrastructure 190, and is not necessarily the same as other cloud platform APIs which handle requests from users external to the cloud infrastructure 190 (e.g. cloud manager software 116 or a user of the cloud manager 116).

At 230, in response to the request, one of the cloud platform APIs 126 sends the identification of the virtual machines within the recovery domain. In an example embodiment, one of the cloud platform APIs 126 sends to virtual machine 146 (of computing device A 140), the identification of virtual machines that are in the same recovery group as virtual machine 146. Virtual machine 146 then stores the identification.

At 240, the STONITH/fencing application 130 receives a request to control one of the virtual machines within the recovery domain. In an example embodiment, this request is received from virtual machine 146 (of computing device A 140). The request can include for example instructions to shut down, restart or fence another virtual machine that is in the same recovery domain as virtual machine 146. In an example embodiment, the request from virtual machine 146 is sent directly to cloud computing device 120, without passing the request to another computing device. In another example embodiment, virtual machine 146 can be given a security certificate or key (e.g. an X.509 certificate) to verify the identity of the STONITH/fencing application 130, before sending a request to it.

At 250, the STONITH/fencing application 130 authorizes the request. In an example embodiment, the STONITH/fencing application 130 authorizes the request based on the identity of virtual machine 146. The identity of the virtual machine 146 can be determined from the logical network connection of the request.

At 260, in response to the request, the STONITH/fencing application 130 forwards the request to the virtual machine manager of the virtual machine to be controlled. In an example embodiment, if virtual machine 146 (of computing device A 140) sends a request to the STONITH/fencing application 130 to control (e.g. shut down, restart or fence) virtual machine 166 (of computing device B 160), the STONITH/fencing application 130 forwards this request to the virtual machine manager 172 (of computing device B 160). In an example embodiment, the request is forwarded directly to virtual machine manager 172 (of computing device B 160), without passing the request to another computing device.

Figure 3:
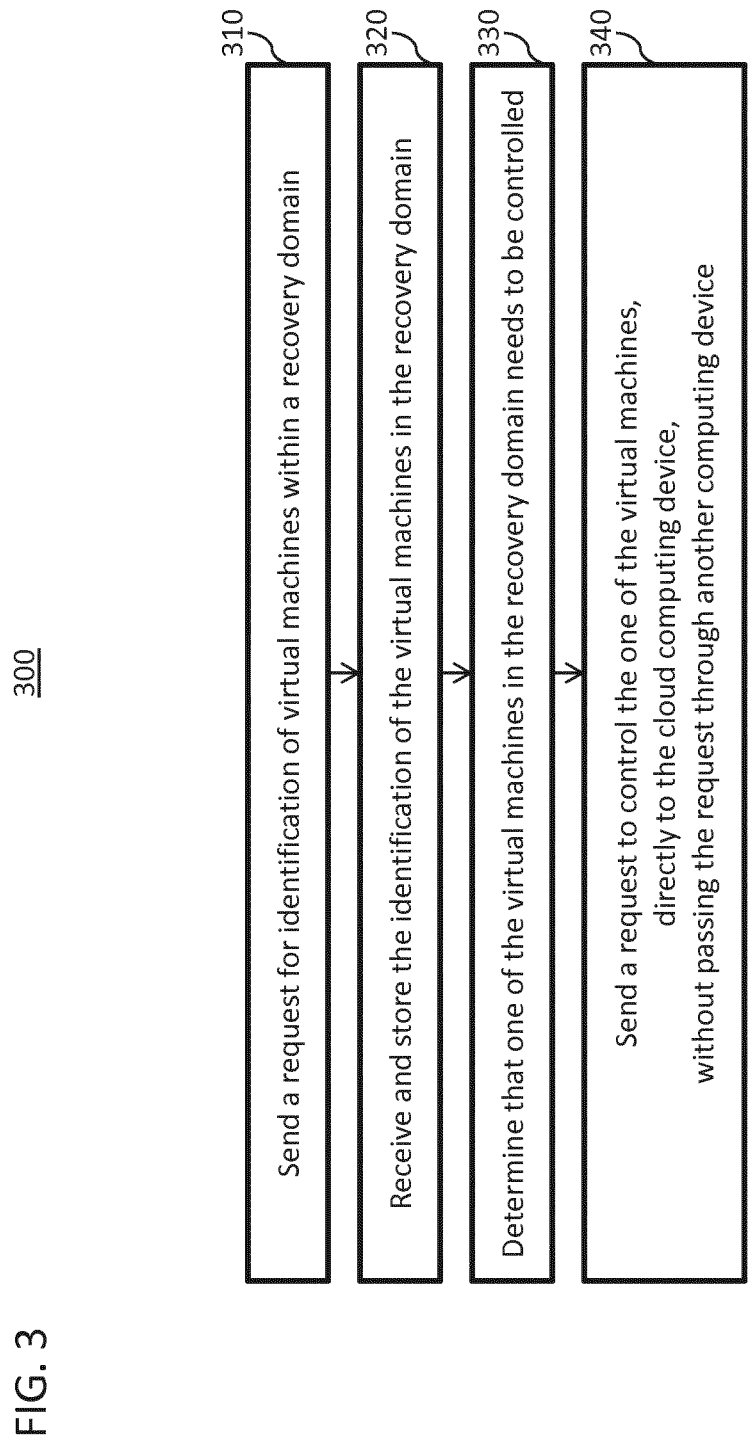
FIG. 3 is a flow chart illustrating another method to control a virtual machine, according to another example embodiment.

FIG. 3 illustrates another method 300 to control a virtual machine, according to an example embodiment. It can be implemented by computing device A 140 (of FIG. 1). (It can also be implemented by computing device B 160 (of FIG. 1).)

At 310, in this example embodiment, virtual machine 146 (of computing device A 140) sends a request for identification of the virtual machines within a recovery domain. In this example, the request is for identification of the virtual machines that are in the same recovery domain as virtual machine 146. In an example embodiment, one of the cloud platform APIs 126 (of cloud computing device 120) determines which virtual machines belong to a particular recovery domain. In response to the request, in this example, one of the cloud platform APIs 126 sends to virtual machine 146 the identification of the virtual machines that are in the same recovery domain as virtual machine 146.

At 320, in response to receiving the identification of the virtual machines within its recovery domain, virtual machine 146 receives and stores the identification.

At 330, virtual machine 146 determines that one of the virtual machines in the recovery domain needs to be controlled (e.g. shut down, restarted or fenced). In an example embodiment, virtual machine 166 (of computing device B 160) is in the same recovery domain as virtual machine 146. In an example embodiment, virtual machine 146 determines that virtual machine 166 needs to by shut down.

At 340, virtual machine 146 sends a request to control one of the virtual machines. In an example embodiment, virtual machine 146 sends a request instructing virtual machine 166 to shut down. In an example embodiment, the request is sent directly to cloud computing device 120, (particularly the STONITH/fencing application 130), without passing the request through another computing device. In another example embodiment, virtual machine 146 can be given a security certificate or key (e.g. an X.509 certificate) to verify the identity of the STONITH/fencing application 130, before sending a request to it. In an example embodiment, the STONITH/fencing application 130 then forwards the request to virtual machine manager 172 (of computing device B 160) and virtual machine manager 172 shuts down virtual machine 166.

Blocks 220-260 of FIG. 2 and blocks 310-340 of FIG. 3 illustrate, there is an administrative network for handling STONITH/fencing requests, that includes in an example embodiment: computing device A 140, link 182, cloud computing device 120, link 184 and computing device B 160. This administrative network for STONITH/fencing requests resides within cloud infrastructure 190 and accordingly, many advantages result from this internal cloud location.

One advantage is that this administrative network provides for low latency in the handling of requests by the STONITH/fencing application 130. In an example embodiment, the STONITH/fencing application 130 is placed as close as possible to the virtual machines 146 and 166. Furthermore, any requests sent to or from virtual machines 146 and 166 are sent directly to or from the STONITH/fencing application 130, without passing the request to another computing device. Accordingly, there is low latency in the handling of the requests by the STONITH/fencing application 130, as there is only one hop in sending of a request from a virtual machine to the STONITH/fencing application 130, and in the forwarding of a request to a virtual machine from the STONITH/fencing application 130. In contrast, if the STONITH/fencing application 130 were implemented outside of cloud infrastructure 190 (e.g. implemented in cloud manager 110), a request from virtual machine 146 to shut down virtual machine 166, would require several hops: a hop from virtual machine 146 to cloud manager 110, a hop from cloud manager 110 to cloud computing device 120 and a hop from cloud computing device 120 to computing device B 160. Furthermore, if the STONITH/fencing application 130 were implemented in the cloud manager 110 outside of cloud infrastructure 190, other computing devices in addition to the STONITH/fencing application 130 would be throttling the cloud manager 110, and this throttling may cause a delay in handling the requests to and from STONITH/fencing application 130.

Other advantages the administrative network provides are security related. If the STONITH/fencing application 130 were implemented in an external cloud platform API, that resides outside of the cloud infrastructure 190 (e.g. within the cloud manager 110), requests sent to and from STONITH/fencing application 130 would require proper authorization tokens to maintain security of the requests. However, virtual machines having these tokens could impose a security risk, as these tokens could be used for any kind of request on the external cloud platform API. This could happen when a virtual machine is compromised (e.g. broken into) and the authorization tokens are retrieved by the intruder.

Another security related advantage that the administrative network provides is that credentials are not needed by the STONITH/fencing application 130 to authorize requests from virtual machines, as the STONITH/fencing application 130 is able to authorize the request based on the identity of the initiator of the request (i.e. the identity of the virtual machine). The identity of the initiator of the request can be determined from the logical network connection of the request. Therefore, since the STONITH/fencing application 130 resides within cloud infrastructure 190, it can deduce the identity of the virtual machine from the logical network connections of the administrative network and without using token based mechanisms.

The blocks of methods 200-300 in FIGS. 2-3 are in no absolute chronological order, and some of the blocks may be performed simultaneously or in an order differing from the given one. Some of the blocks or part of the blocks can also be left out or replaced by a corresponding block or part of the blocks.

The terms "request" or "requesting", disclosed throughout the Detailed Description does not imply that a server-client or a master-slave approach is or needs to be used. The terms "requesting" and "request" can be defined as asking and the act of asking. Furthermore, the requests disclosed throughout the Detailed Description are only examples and may even include several separate communications for sending the same information. In addition, the requests may also contain other information.

It will be obvious to a person skilled in the art that, as technology advances, the inventive concept can be implemented in various ways. The invention and its embodiments are not limited to the examples described above but may vary within the scope of the claims.

The invention claimed is:

1. A method, implemented by cloud computing device, to control a virtual machine, comprising:
    sending identification of virtual machines within a recovery domain comprising at least two virtual machines that are permitted to control each other;
    receiving a request to control one of the virtual machines, after a determination that the one of the virtual machines needs to be shut down, restarted, or fenced;
    authorizing the request, wherein the request is authorized based on an identity of the initiator of the request and the initiator is another of the virtual machines; and
    forwarding the request to a virtual machine manager of the one of the virtual machines.

2. The method of claim 1, wherein the cloud computing device resides within a cloud infrastructure.

3. The method of claim 2, wherein the cloud infrastructure is an infrastructure as a service (IaaS).

4. The method of claim 1, wherein the request comprises instructions to shut down, restart or fence the one of the virtual machines.

5. The method of claim 1, wherein the received request is sent directly from another one of the virtual machines within the recovery domain, without passing through another computing device.

6. The method of claim 1, wherein the forwarded request is sent directly to the virtual machine manager, without passing through another computing device.

7. The method of claim 1, further comprising receiving and storing the identification of the virtual machines within a recovery domain.

8. The method of claim 1, wherein the identity of the initiator of the request is determined from a logical network connection of the request.

9. A cloud computing device, to control a virtual machine, comprising:
    a processor, configured to:
    send identification of virtual machines within a recovery domain comprising at least two virtual machines that are permitted to control each other;
    receive a request to control one of the virtual machines, after a determination that the one of the virtual machines needs to be shut down, restarted, or fenced;
    authorize the request wherein the processor is configured to authorize the request, based on an identity of the initiator of the request and the initiator is another of the virtual machines; and
    forward the request to a virtual machine manager of the one of the virtual machines.

10. The cloud computing device of claim 9, wherein the cloud computing device resides within a cloud infrastructure.

11. The cloud computing device of claim 10, wherein the cloud infrastructure is an infrastructure as a service (IaaS).

12. The cloud computing device of claim 9, wherein the request comprises instructions to shut down, restart or fence the one of the virtual machines.

13. The cloud computing device of claim 9, wherein the received request is sent directly from another one of the virtual machines within the recovery domain, without passing through another computing device.

14. The cloud computing device of claim 9, wherein the forwarded request is sent directly to the virtual machine manager, without passing through another computing device.

15. The cloud computing device of claim 9, further comprising receiving and storing the identification of the virtual machines within a recovery domain.

16. The cloud computing device of claim 9, wherein the processor is configured to determine the identity of the initiator of the request, from a logical network connection of the request.

17. A method, implemented by a computing device hosting a virtual machine, comprising:
    sending a request, for identification of virtual machines within a recovery domain comprising at least two virtual machines that are permitted to control each other, directly to a cloud computing device, without passing the request through another computing device;
    determining that one of the virtual machines needs to be controlled; and
    sending, after a determination that the one of the virtual machines needs to be shut down, restarted, or fenced, a request to control the one of the virtual machines directly to the cloud computing device, without passing the request through another computing device, wherein the request is configured to be authorized based on an identity of the initiator of the request and the initiator is another of the virtual machines.

18. The method of claim 17, further comprising receiving a security certificate or key, before sending the request to control the one of the virtual machines.

* * * * *